No. 886,874. PATENTED MAY 5, 1908.
A. SCHNELLER.
APPARATUS FOR PRODUCING ELECTRIC DISCHARGES THROUGH GASES.
APPLICATION FILED APR. 25, 1904.
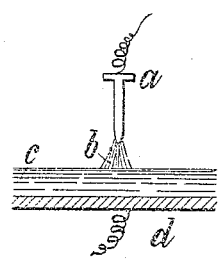
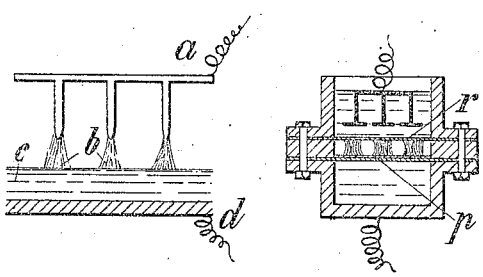
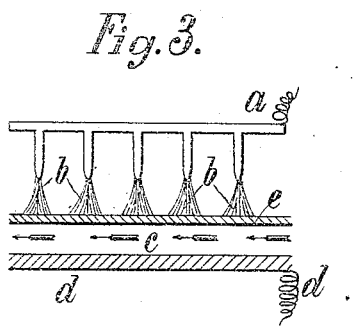
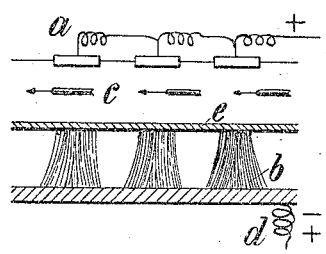
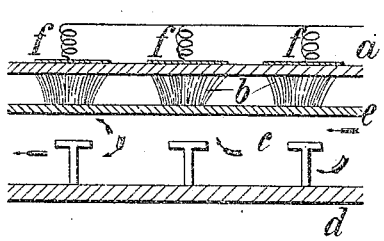
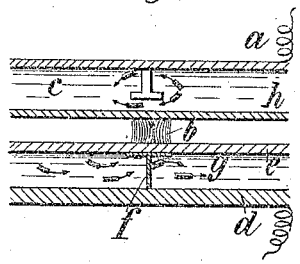
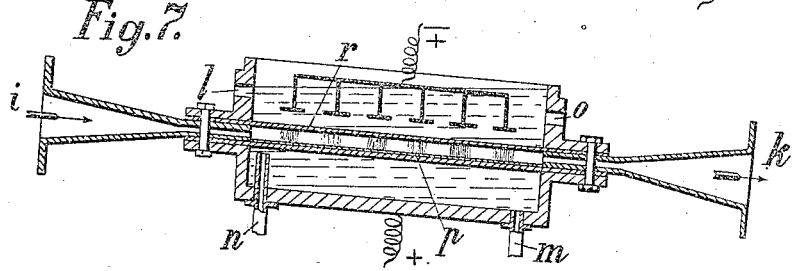
WITNESSES:
W. M. Avery
A. H. Davis
INVENTOR
August Schneller
ATTORNEYS.

UNITED STATES PATENT OFFICE.

AUGUST SCHNELLER, OF GINNEKEN, NEAR BREDA, NETHERLANDS, ASSIGNOR TO PERCY THOMPSON, OF EAST ORANGE, NEW JERSEY.

APPARATUS FOR PRODUCING ELECTRIC DISCHARGES THROUGH GASES.

No. 886,874. Specification of Letters Patent. Patented May 5, 1908.

Application filed April 25, 1904. Serial No. 204,803.

*To all whom it may concern:*

Be it known that I, AUGUST SCHNELLER, of Ginneken, near Breda, Netherlands, have invented a new and Improved Apparatus for Producing Electric Discharges Through Gases, of which the following is a full, clear, and exact description.

The object of my invention is to provide a new and improved apparatus whereby electricity is discharged through gases, in such apparatus a fluid dielectric being utilized.

In the discharge apparatus heretofore employed chiefly for the production of ozone, only solid substances such as glass tubes or plates, mica, enameled metals and the like, have been used as dielectric poles. When very low tensions are employed, these dielectric substances, even when finely laminated, are practically insulating bodies. When higher tensions (such as from 6000 to 10000 volts) are employed, these finely laminated substances act as dielectrics; if the substances be moderately (some millimeters) thick they act as resistances; if they be very thick they act as insulating bodies, even at very high tensions. When a current of appreciable strength (of e. g. 0.000001 amp. per square centimeter) passes through great resistances, a marked difference in potential is produced between the one side and the other. The interior of the dielectric layers becomes heated at such tensions, the temperature rising as the tension increases. As a result, the absolute resistance, or else the dielectric properties are so changed that simultaneously with the increase in the current strength, the dielectric condition is destroyed. The electricity is thereupon first transformed into a brush discharge, then into spark, and finally into the discharge form of preparing or commencing the voltaic arc. In order to avoid the dangers of overheating, attempts have been made to cool the dielectric, a greater output being simultaneously obtained, since by heating, a re-dissociation of the product results.

Heretofore, the dielectric pole surfaces have been cooled by widely different methods. If a metallic coating be used to the rear of the dielectric layer, such coating is transformed into a metallic receptacle in which the cooling agent may be contained. If one pole of the apparatus be grounded, the cooling of this pole may be effected directly with water, which may be regarded as an electric conductor. Consequently, the grounded pole may be uninterruptedly cooled without difficulty. The problem of cooling the dielectric layer of the insulated pole is more formidable. It is necessary to employ an intermittent cooling process. During the renewal of the cooling agent the apparatus must be stopped; or, if the apparatus is to continue in operation uninterruptedly, either an insulated tumbler is employed, or the water is allowed to fall in drops in order thus to form a cataract for the difference in potential. If the conducting cooling agent be disposed in immediate proximity to the dielectric layer, a practice followed generally in the older laboratory apparatus employing concentric tubes, the grounded pole may be cooled continuously, but the insulated pole must be intermittently cooled. These difficulties are all overcome in the present invention, a fluid being utilized which is highly resistant even at the high tensions employed. If such a fluid be used, it may substitute the solid dielectric so that it is possible to dispense with special cooling means by a temporary or permanent change or circulation of the fluid. Solid dielectrics, if they be also employed, are cooled by this fluid, which, on account of its great electrical resistance, requires the exercise of none of the precautions rendered necessary, as above mentioned, in the case of water or the like. Furthermore, the utilization of such a fluid by reason of its homogeneity or uniform internal cohesion is far more advantageous than the employment of solid dielectrics alone, which, in practice, are more or less heterogeneous in structure, and likely to have crevices or to be of uneven thickness. Fluids of great electrical resistance are oil, oils partially saponified, benzol, carbon bisulfid, and the like. The use of such fluids will be hereinafter more fully described and set forth in the claims.

Reference is to be had to the accompanying drawings forming a part of this specification, in which similar characters of reference indicate corresponding parts in all the figures.

Figure 1 represents diagrammatically a simple form of apparatus for the discharge of electricity through a moving fluid dielectric; Figs. 2, 3, 4, 5 and 6 are modifications of such apparatus; and Fig. 7 is a partial longitudinal section of a preferred form of apparatus. Fig. 8 is a vertical cross section through the mechanism shown in Fig. 7.

Referring to Fig. 1, $a$ and $d$ are the poles; $b$ represents the discharge; $c$ represents a moving fluid layer of maximum resistance. The passage of the fluid through the gaseous layer $b$ is accompanied by invisible discharges, which effect the chemical or molecular alteration. The prolongation of these discharges pass through the fluid layer $c$, which on account of its resistance, becomes heated and also absorbs heat from the gaseous layer $b$. Since the layer $c$ is in motion, new portions of the fluid are constantly transformed from dielectrics to mechanical cooling agents.

In Fig. 2, a constant repetition of this process occurs. The moving fluid layer first reaches a zone where it acts as dielectric; on leaving the zone it appears as an indifferent insulator and cooling fluid, and then enters another discharge zone, and so on, finally emerging from the apparatus in a heated condition. After having been cooled outside the apparatus, the fluid can be repeatedly used to form the layer $c$, and as a cooling agent.

I am aware that oil is used as an insulating layer in high tension transformers, and that the process of cooling the fluid outside of the transformer is also frequently employed. In my apparatus for the discharge of electricity through gases, however, the oil is used not only to cool, but also to form a dielectric layer. In applying this principle there is nothing to prevent the utilization of a second dielectric layer $e$ (Fig. 3) of some solid substance. This layer $e$ may be very thin; for the cooling fluid throughout its total thickness $c$ acts as a complementary dielectric layer.

Whether the fluid $c$ flows under the auxiliary layer $e$, as in Fig. 3, or over the layer $e$, as in Fig. 4, a most intense cooling effect is obtained. The metallic conductors in the system shown in Fig. 4 may project into the layer of moving oil. The oil layer $c$, as shown in Fig. 5, may completely cover the conducting plate $d$, and the partitions or baffles with which it is provided. In this case the oil layer throughout its entire extent has a cooling effect upon the dischargers. Between the discharger $e$ and the solid dielectric layer at the prolongations of the discharges, however, the oil layer acts as a second dielectric medium.

By combining the systems shown in Figs. 4 and 5, the device shown in Fig. 6 is obtained. In this instance, the conductor $a$ is provided with a dam projecting into the moving oil layer; $h$ is another dielectric layer of some solid substance; $b$ is the electric discharge, $e$ is a dielectric plate; $ff$ the metallic plates and their connections; $g$ is a moving cooling fluid; $d$ is the other pole. The electric discharges thereupon each assume a shape related to that of the metallic conductor, frequently appearing as a more or less truncated pyramid or a cylinder compressed in its middle.

Fig. 7 represents the preferred form of apparatus which I employ. The apparatus consists of three cast-iron parts which are secured together, and form three containers, and a pole of a high tension transformer. The central container serves as a passageway for the gas which is to be subjected to the electrical discharges, which passageway has its entrance at $i$ and its exit at $k$. The lower container, which is grounded, is filled with comparatively pure water which acts as an insulator or oil which enters through the inlet $m$, and which is discharged through the outlet $n$. Between this lower container and the central container, serving as a passageway for the gas to be treated, is a metal plate $p$ enameled on the upper discharge side, for which plate some dielectric substance, such as a glass or porcelain plate can be substituted. If oil cooling be used, other conductors are to be used below or in this dielectric layer. These conductors may have the form of points or strips, if desired.

The dimensions of the apparatus shown in Fig. 7 depend upon the quantity of gas to be treated. Various potentials may be employed according to circumstances, a potential of 40,000 volts usually being sufficient.

In Fig. 8 the enameled surfaces may be seen in their relation to the electric discharge. The arrows indicate the inlet and outlet of this feature of the apparatus, the action of which is thus readily understood. In the upper container, inlet and outlet openings respectively designated $l$ and $o$ are provided for a circulating oil layer. Between the oil layer and the central container is a thin dielectric plate $r$. In the oil layer of the upper container are the current-conducting points or strips of the other insulated pole of the high tension transformer. There is nothing to prevent a modification of the thickness of the gas layer to be subjected to the electrical discharges up to 30 and more millimeters. This will depend on the size and productive capacity of the apparatus. The tension of the transformer may vary from 60000 volts upward.

Having thus described my invention, I claim as new and desire to secure by Letters Patent,—

1. An apparatus for subjecting gases to invisible electric discharges, comprising discharge terminals and means for circulating therebetween a flowing medium for the purpose of cooling said terminals.

2. An apparatus for subjecting gases to invisible electric discharges, comprising discharge terminals and means for circulating therebetween a flowing dielectric medium for the purpose of cooling said terminals.

3. An apparatus for subjecting gases to invisible electrical discharges, comprising discharge terminals, and a fluid dielectric flowing continuously between such terminals, for the purpose set forth.

4. An apparatus for subjecting gases to invisible electrical discharges, comprising discharge terminals, and an electrically resistant fluid dielectric flowing intermittently between such terminals, for the purpose set forth.

5. An apparatus for subjecting gases to invisible electrical discharges, comprising discharge terminals, and an electrically resistant fluid dielectric between one terminal and a solid dielectric, for the purpose set forth.

6. An apparatus for subjecting gases to invisible electrical discharges, comprising discharge terminals, one terminal having prolongations, and a fluid dielectric disposed between such terminals, for the purpose set forth.

7. An apparatus for subjecting gases to invisible electrical discharges, comprising discharge terminals, one terminal having prolongations projecting into a fluid dielectric, disposed between this terminal and a solid dielectric, for the purpose set forth.

8. An apparatus for subjecting gases to invisible electrical discharges, comprising discharge terminals, a moving cooling fluid disposed between one terminal and a solid dielectric plate provided with a coating, for the purpose set forth.

9. An apparatus for subjecting gases to invisible electrical discharges, comprising discharge terminals, a cooling fluid disposed between one terminal and a solid dielectric, the second terminal having prolongations projecting into a dielectric fluid layer disposed between this terminal and a second solid dielectric substance, for the purpose set forth.

10. An apparatus for subjecting gases to invisible electrical discharges, comprising discharge terminals, a cooling fluid disposed between one terminal and the solid dielectric substance, the second terminal having prolongations projecting into a dielectric fluid layer disposed between this terminal and a second solid dielectric substance, and an inlet and outlet for conducting the gases to be subjected between the two solid dielectric layers, for the purpose set forth.

11. An apparatus for subjecting gases to invisible electrical discharges, comprising terminals, a solid dielectric substance, a cooling fluid disposed intermediate of one of said terminals and a solid dielectric substance, the other terminals having portions projecting into another dielectric substance, and means for conducting the gases between the two solid dielectric substances.

12. An apparatus for subjecting gases to invisible electrical discharges, comprising terminals, a dielectric substance disposed adjacent to one of said terminals, and means for causing a liquid to circulate in the space intermediate of said solid dielectric substance and the terminals adjacent thereto.

In testimony whereof I have signed my name to this specification in the presence of two subscribing witnesses.

AUGUST SCHNELLER.

Witnesses:
J. IMER,
A. M. WOONWINDEN.